(12) United States Patent
Lv et al.

(10) Patent No.: US 9,964,227 B2
(45) Date of Patent: May 8, 2018

(54) ELECTRONIC EXPANSION VALVE AND MANUFACTURING METHOD THEREFOR

(71) Applicant: Zhejiang Sanhua Co., Ltd., Zhejiang (CN)

(72) Inventors: Ming Lv, Zhejiang (CN); Xianrang Wei, Zhejiang (CN)

(73) Assignee: ZHEJIANG SANHUA CLIMATE & APPLIANCE CONTROLS GROUP CO., LTD., Shaoxing, Zhejinag (CN)

( * ) Notice: Subject to any disclaimer, the term of this patent is extended or adjusted under 35 U.S.C. 154(b) by 178 days.

(21) Appl. No.: 14/903,007

(22) PCT Filed: Sep. 11, 2013

(86) PCT No.: PCT/CN2013/083293
§ 371 (c)(1),
(2) Date: Jan. 5, 2016

(87) PCT Pub. No.: WO2015/007013
PCT Pub. Date: Jan. 22, 2015

(65) Prior Publication Data
US 2016/0161014 A1 Jun. 9, 2016

(30) Foreign Application Priority Data

Jul. 17, 2013 (CN) .......................... 2013 1 0304321
Jul. 17, 2013 (CN) .......................... 2013 1 0304556
Jul. 17, 2013 (CN) .......................... 2013 1 0304567

(51) Int. Cl.
*F16K 31/04* (2006.01)
*F16K 1/10* (2006.01)
(Continued)

(52) U.S. Cl.
CPC .............. *F16K 31/04* (2013.01); *B23K 26/21* (2015.10); *B23K 26/282* (2015.10); *F16K 1/10* (2013.01);
(Continued)

(58) Field of Classification Search
CPC .......... F16K 31/04; F16K 31/508; F16K 1/34; F16K 1/10; F16K 27/102; F25B 41/062;
(Continued)

(56) References Cited

U.S. PATENT DOCUMENTS 3,514,130 A * 5/1970 Milleville ............. F16K 27/102
228/169
4,801,125 A 1/1989 Kocher
(Continued)

FOREIGN PATENT DOCUMENTS

| CN | 1114923 A | 1/1996 |
|---|---|---|
| CN | 2713261 Y | 7/2005 |

(Continued)

OTHER PUBLICATIONS

Chinese First Office Action dated Mar. 24, 2016 for corresponding Chinese Application No. 201310304567.3, 6 pages.
(Continued)

*Primary Examiner* — Ian Paquette
(74) *Attorney, Agent, or Firm* — Ohlandt, Greeley, Ruggiero & Perle, LLP

(57) ABSTRACT

An electronic expansion valve according to the present application includes a housing component and a valve seat assembly, the valve seat assembly includes a first connecting pipe and a second connecting pipe which are in a same straight line; a main valve cavity is formed by the valve seat assembly, and an included angle formed between the main valve cavity and the first connecting pipe is an acute angle; wherein the valve seat assembly is of an integral structure
(Continued)

and is fixed to the housing component by welding, and a preset distance exists between the first connecting pipe and an extension line of a welding position of the valve seat assembly and the housing component in a radial direction.

19 Claims, 21 Drawing Sheets

(51) Int. Cl.
    *F16K 27/10*        (2006.01)
    *B23K 26/21*        (2014.01)
    *B23K 26/282*      (2014.01)
    *F16K 1/34*         (2006.01)
    *F25B 41/06*       (2006.01)
    *B23K 101/04*      (2006.01)

(52) U.S. Cl.
    CPC .............. *F16K 1/34* (2013.01); *F16K 27/102* (2013.01); *F25B 41/062* (2013.01); *B23K 2201/04* (2013.01); *F25B 2341/0653* (2013.01); *Y02B 30/72* (2013.01)

(58) Field of Classification Search
    CPC ........... F25B 2341/0653; B23K 26/21; B23K 26/282; B23K 2201/04; Y02B 30/72
    USPC ............................................ 251/266, 129.11
    See application file for complete search history.

(56) References Cited

U.S. PATENT DOCUMENTS

| | | | | |
|---|---|---|---|---|
| 8,333,363 | B2* | 12/2012 | Nalini | F16K 31/04 251/129.11 |
| 8,678,348 | B1* | 3/2014 | Cassel | F16K 1/04 137/556 |
| 8,695,642 | B2* | 4/2014 | Danielson | F16K 11/20 137/881 |
| 9,416,890 | B2* | 8/2016 | Nissen | F16K 31/04 |
| 2006/0005890 | A1 | 1/2006 | Johnsen et al. | |
| 2008/0190134 | A1* | 8/2008 | Khatib | F25B 39/028 62/525 |

FOREIGN PATENT DOCUMENTS

| | | |
|---|---|---|
| CN | 1673589 A | 9/2005 |
| CN | 1985118 A | 6/2007 |
| CN | 101214606 A | 7/2008 |
| CN | 201351755 Y | 11/2009 |
| CN | 101749472 A | 6/2010 |
| CN | 102615420 A | 8/2012 |
| CN | 102734476 A | 10/2012 |
| CN | 102734526 A | 10/2012 |
| CN | 102840370 A | 12/2012 |
| CN | 102840372 A | 12/2012 |
| CN | 102853597 A | 1/2013 |
| CN | 202978556 U | 6/2013 |
| CN | 203009981 U | 6/2013 |
| EP | 1561982 A1 | 8/2005 |
| EP | 2014964 A1 | 1/2009 |
| JP | S17014924 Y | 12/1943 |
| JP | S522885 Y2 | 1/1977 |
| JP | 07-217759 A | 8/1995 |
| JP | 09264446 A | 10/1997 |
| JP | 2008505293 A | 2/2008 |
| WO | 2006/005338 A1 | 1/2006 |

OTHER PUBLICATIONS

Chinese First Office Action dated Feb. 26, 2016 for corresponding Chinese Application No. 201310304321.6, 8 pages.
European Search Report dated Feb. 20, 2017 for European application No. 13889373.0.
Japanese Office Action dated Feb. 14, 2017 for Japanese application No. 2016-526400.
Chinese Office Action dated Feb. 3, 2016 from corresponding Chinese Patent Application No. 201310304556.5 with English translation, 6 pages.
International Search Report dated May 19, 2014 for PCT application No. PCT/CN2013/083293.

* cited by examiner

ELECTRONIC EXPANSION VALVE AND MANUFACTURING METHOD THEREFOR

CROSS-REFERENCED APPLICATIONS

This application is the national phase of International Application No. PCT/CN2013/083293, titled "ELECTRONIC EXPANSION VALVE AND MANUFACTURING METHOD THEREFOR", filed on Sep. 11, 2013, which claims the benefit of priorities to Chinese Patent Application No. 201310304567.3 titled "ELECTRONIC EXPANSION VALVE AND MANUFACTURE METHOD THEREOF", filed with the Chinese State Intellectual Property Office on Jul. 17, 2013, Chinese Patent Application No. 201310304321.6 titled "MANUFACTURE METHOD OF ELECTRIC CONTROL VALVE", filed with the Chinese State Intellectual Property Office on Jul. 17, 2013, and Chinese Patent Application No. 201310304556.5 titled "ELECTRONIC EXPANSION VALVE", filed with the Chinese State Intellectual Property Office on Jul. 17, 2013, the entire disclosures of all of the above applications are incorporated herein by reference.

BACKGROUND

1. Field of the Disclosure

The present application relates to the technical field of valve bodies, specifically to an electronic expansion valve and a manufacture method thereof.

2. Discussion of the Background Art

Reference is made to FIG. 1, which is a schematic view showing the structure of a typical electronic expansion valve.

The electronic expansion valve includes a valve seat assembly, a housing component 64, and a valve rod assembly 130. The valve seat assembly includes a valve seat 24 and a cover 60, a first port 18 and a second port 16 are oppositely provided at a lower end of the valve seat 24, and are used to connect a first connecting pipe 18a and a second connecting pipe 16a respectively, and the first connecting pipe 18a and the second connecting pipe 16a are in a same straight line. A main valve cavity is formed by the valve seat 24, and the main valve cavity is arranged at an acute angle with respect to the first connecting pipe 18a, that is, the valve seat 24 is of a "⊦"-like shape.

A motor 70 of the electronic expansion valve is mounted in the valve seat assembly or the housing component 64. In FIG. 1, the housing component 64 and the cover 60 cooperate to form a complete cavity to accommodate the whole motor 70. The housing component 64 and the cover 60 are connected via threads, and the cover 60 and the valve seat 24 are also connected via threads. In FIG. 1, an end of the valve seat 24 is provided with a connecting portion, and the cover 60 is connected to the connecting portion via threads. When the motor 70 rotates, the motor 70 drives the valve rod assembly 130 to rotate via a gear system 76, to allow a valve needle of the valve rod assembly 130 to block or leave a valve port, thereby cutting off or allowing the communication between the first connecting pipe 18a and the second connecting pipe 16a.

The above technical solution has the following technical problems.

Firstly, multiple components of the electronic expansion valve are connected via threads, for example, the cover 60 of the valve seat assembly is connected to the housing component 64 via threads, the cover 60 is connected to the valve seat 24 via threads, and parts at a top of the housing component 64, such as a top cap, are also connected via threads. During a large scale assembly process, reliable seal cannot be guaranteed, and a reject rate caused by leakage is high. Besides, due to the vibration, corrosion and oxidation during a transport process and a use process, the leakage amount at a threaded connection portion may be sharply increased as the used time increases.

Secondly, in the case that a threaded connection is employed, the strength of the connection portion needs to be ensured, which requires to increase a design thickness and a weight of the material, thus resulting in a high product cost.

In view of this, it is an urgent technical issue for those skilled in the art to improve a sealing performance of the electronic expansion valve.

SUMMARY

For addressing the above technical issues, an object of the present application is to provide an electronic expansion valve and a manufacture method thereof. The electronic expansion valve has a good sealing performance.

The electronic expansion valve according to the present application includes a housing component and a valve seat assembly, the valve seat assembly includes a first connecting pipe and a second connecting pipe which are in a same straight line; a main valve cavity is formed by the valve seat assembly, and an included angle formed between the main valve cavity and the first connecting pipe is an acute angle; wherein the valve seat assembly is of an integral structure and is fixed to the housing component by welding, and a preset distance exists between the first connecting pipe and an extension line of a welding position of the valve seat assembly and the housing component in a radial direction.

For the electronic expansion valve, due to the preset distance between the extension line of the welding position in the radial direction and the first connecting pipe, the welding can be smoothly performed without being blocked by the first connecting pipe when the valve body rotates relatively to be welded, which allows the housing component and the valve seat assembly to be welded to form an integrated body. Compared with the threaded connection in the background technology, the electronic expansion valve in the present application is of an integral structure, which may obviously decrease the leakage rate of the product, and also, there is no need to increase the thickness and weight of the material, which may effectively control the manufacturing cost of the product.

Preferably, a minimum distance δ between the extension line in the radial direction and an end portion of the first connecting pipe meets the relational expression:

$$\delta = L1 - L2 \times \cos \alpha - (D3 - D2)/2 \times \sin \alpha;$$

where α is the included angle, which is the acute angle, L1 is a distance between a base point of the valve seat and an end portion of the valve seat assembly, L2 is a distance between the base point of the valve seat and the end portion of the first connecting pipe, D3 is a diameter of the end portion of the first connecting pipe, and D2 is a diameter of a port, configured to connect the first connecting pipe, of the valve seat assembly; and the base point of the valve seat is an intersection point of an axis of the main valve cavity and an extension line of an inner wall of the port.

Preferably, a minimum distance δ between the extension line in the radial direction and an end portion of the first connecting pipe is greater than or equal to 5 millimeters.

Preferably, the included angle α, which is the acute angle, ranges from 40 degrees to 60 degrees.

Preferably, the valve seat assembly and the housing component are fixed by laser welding or argon arc welding.

Preferably, the valve seat assembly includes a valve seat and a cover, the main valve cavity is formed in the valve seat; the cover has one end fixed to the housing component by welding and another end welded to the valve seat by braze welding to form an integrated body; and the first connecting pipe and the second connecting pipe are both welded to the valve seat by braze welding to form an integrated body.

Preferably, the valve seat assembly further includes a valve seat core arranged in the main valve cavity, and the valve seat core is fixed to the valve seat by braze welding to form an integrated body.

Preferably, an outer periphery of the valve seat core and/or an outer periphery of the valve seat each is provided with an annular groove configured to position a welding ring; and a groove wall at a lower side of the annular groove is a slope inclining downward.

Preferably, an angle of the slope is smaller than 60 degrees.

Preferably, the motor is provided with a lead fixing device configured to fix the position of a lead of the motor; and the lead fixing device has a lead groove configured to accommodate the lead of the motor, and a positioning portion configured to fix the position of the lead fixing device with respect to an outer periphery of the motor.

Preferably, the lead fixing device has a through hole running through an inner surface and an outer surface of the lead fixing device, and the through hole is in communication with the lead groove.

Preferably, the positioning portion is a retaining groove at a bottom of the lead fixing device, and the retaining groove is configured to retain an outer edge of a bottom end cover of the motor.

Preferably, a step is formed on an outer surface, away from the motor, of the lead fixing device, and the step has a surface facing upward; and the step is located at an upper portion of the lead fixing device.

Preferably, each of the inner surface and the outer surface of the lead fixing device is arranged to have an arc shape, and has a radian matching with a radian of an outer peripheral surface of the motor; and the lead fixing device is made from thermal insulation material.

A manufacture method of an electronic expansion valve is further provided according to the present application, the electronic expansion valve includes a housing component and a valve seat assembly, the valve seat assembly includes a first connecting pipe and a second connecting pipe which are in a same straight line; a main valve cavity is formed by the valve seat assembly, and an included angle formed between the main valve cavity and the first connecting pipe is an acute angle. The manufacture method includes the following steps:

manufacturing an integrated valve seat assembly, and setting a preset distance between the first connecting pipe and an extension line of a welding position of the valve seat assembly and the housing component in a radial direction; and fixing the housing component and the valve seat assembly at the welding position by welding.

The principle of the manufacture method is consistent with the principle of the above electronic expansion valve, and thus having the same technical effects.

Preferably, the integrated valve seat assembly is manufactured by the following steps:

preparing components of the valve seat assembly, including a valve seat configured to form the main valve cavity, a first connecting pipe and a second connecting pipe configured to be connected to the valve seat, and a cover configured to be welded to the housing component;

mounting the first connecting pipe and the second connecting pipe to ports of the valve seat respectively, and mounting the cover to an end portion of the valve seat; and placing the first connecting pipe, the second connecting pipe, the valve seat, and the cover which are mounted in place in a furnace at the same time, and performing braze welding.

Preferably, the components of the valve seat assembly further include a valve seat core, and the steps for manufacturing the integrated valve seat assembly includes mounting the valve seat core in the valve seat, and placing the valve seat core together with the first connecting pipe, the second connecting pipe, the valve seat, and the cover in the furnace at the same time, and performing braze welding.

Preferably, the valve seat core is formed by the following steps:

manufacturing a wax mold corresponding to the valve seat core;

perform an injection molding on the wax mold to form a wax model;

coating an outer surface of the wax model with refractory material to form a shell;

heating the wax model to dewax the wax model to form a mold shell;

pouring melted stainless steel into the mold shell;

removing the mold shell to form a hollow stainless steel semi-finished product; and lathing the hollow stainless steel semi-finished product to form the valve seat core.

Preferably, the valve seat is formed by the following steps:

manufacturing a wax mold corresponding to the valve seat;

perform an injection molding on the wax mold to form a wax model;

coating an outer surface of the wax model with refractory material to form a shell;

heating the wax model to dewax the wax model to form a mold shell;

pouring melted stainless steel into the mold shell;

removing the mold shell to form a hollow stainless steel semi-finished product; and lathing the hollow stainless steel semi-finished product to form the valve seat.

Preferably, the valve seat, the first connecting pipe and the second connecting pipe are formed by the following steps:

manufacturing a wax mold corresponding to an assembly of the valve seat, the first connecting pipe and the second connecting pipe being assembled together;

perform an injection molding on the wax mold to form a wax model;

coating an outer surface of the wax model with refractory material to form a shell;

heating the wax model to dewax the wax model to form a mold shell;

pouring melted stainless steel into the mold shell;

removing the mold shell to form a hollow stainless steel semi-finished product; and lathing the hollow stainless steel semi-finished product to form an integrated body of the valve seat, the first connecting pipe and the second connecting pipe.

Figure 1:
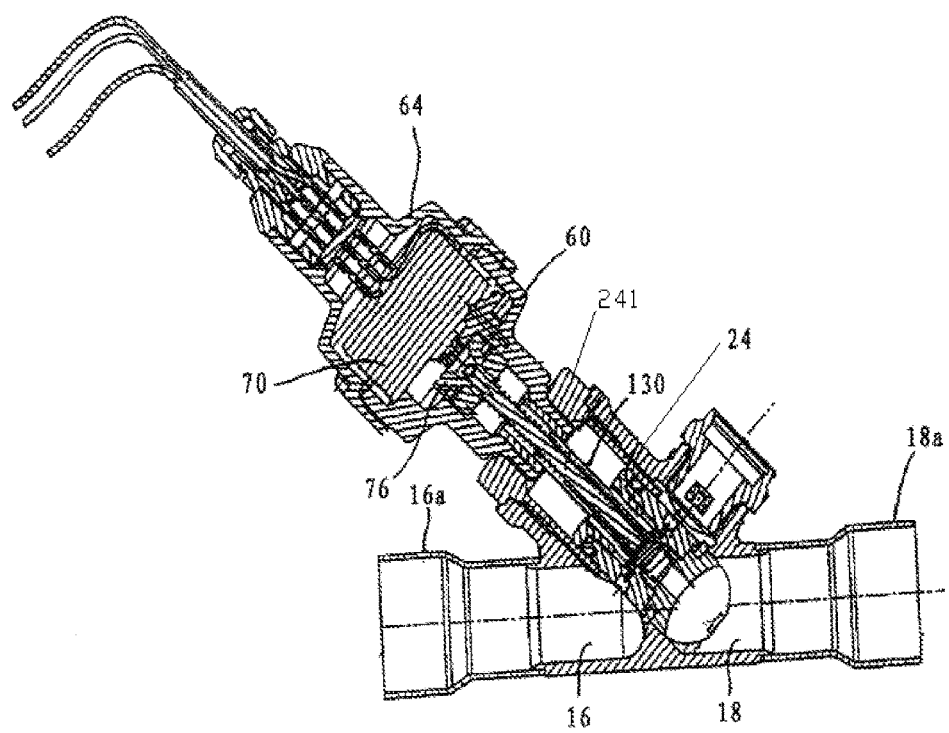
FIG. 1 is a schematic view showing the structure of a typical electronic expansion valve.

Reference Numerals in FIG. 1:

| 64 housing component, | 60 cover, |
|---|---|
| 70 motor, | 76 gear system, |

-continued

| 130 valve rod assembly, | 18 first port, |
|---|---|
| 18a first connecting pipe, | 16 second port, |
| 16a second connecting pipe, and | 24 valve seat. |

Reference Numerals in FIGS. 2 to 31:

| 21 valve seat, | 211 first port, |
|---|---|
| 212 second port, | 213 mounting boss, |
| 214 first annular retaining groove, | 214a first slope, |
| 21a communication port, | 21b valve port, |
| 22 cover, | 221 upper step, |
| 222 lower step, | 23 second connecting pipe, |
| 24 first connecting pipe, | 25 sight glass, |
| 26 valve seat core, | 261 lateral hole, |
| 262 second annular retaining groove, | 262a second slope, |
| 3 housing component, | 4 motor, |
| 41 bottom end cover, | 42 top end cover, |
| 43 lead, | 4a lead fixing device, |
| 4a1 lead groove, | 4a2 step, |
| 4a3 through hole, | 4a4 retaining groove, |
| 4a-1 bottom, | 5 gear system, |
| 6 valve rod assembly; | 7 welding ring, and |
| 2a welding position. | |

DETAILED DESCRIPTION OF THE PREFERRED EMBODIMENTS

For making those skilled in the art to better understand the technical solutions of the present application, the present application is further described in detail in conjunction with drawings and embodiments hereinafter.

Figure 2:
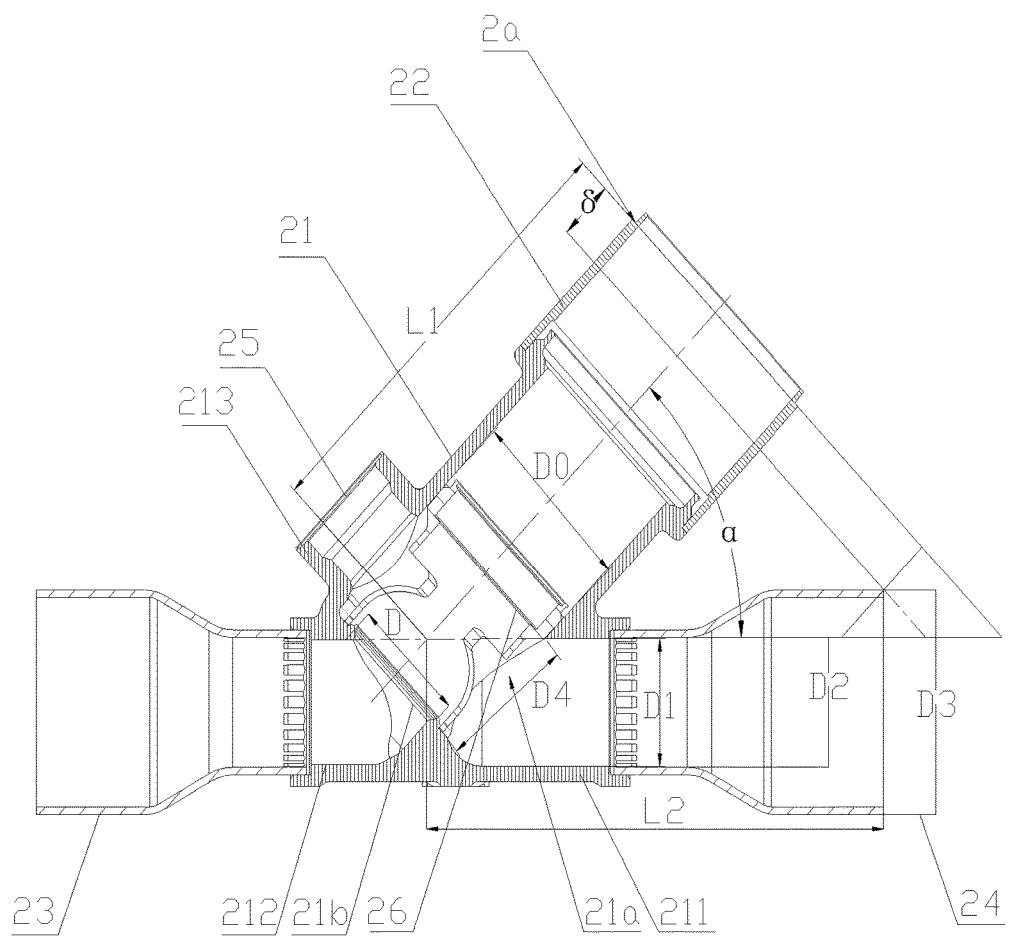
FIG. 2 is a schematic view showing the structure of a valve seat assembly of an electronic expansion valve according to an embodiment of the present application.
Figure 3:
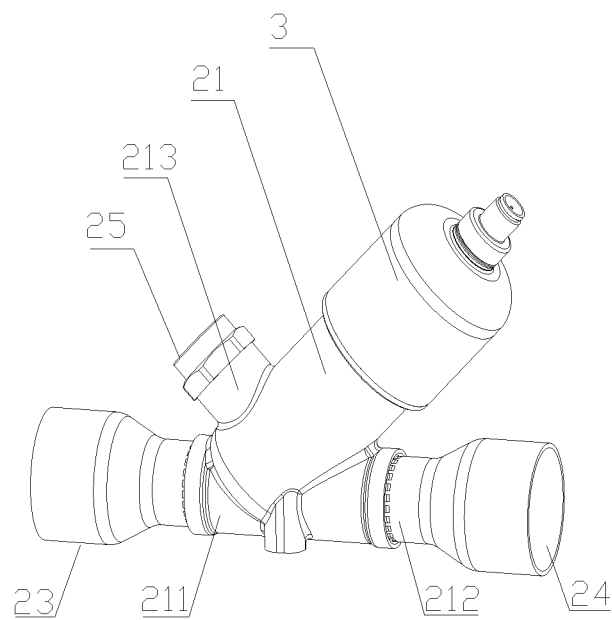
FIG. 3 is a schematic view showing the structure of an electronic expansion valve having the valve seat assembly in FIG. 2.
Figure 4:
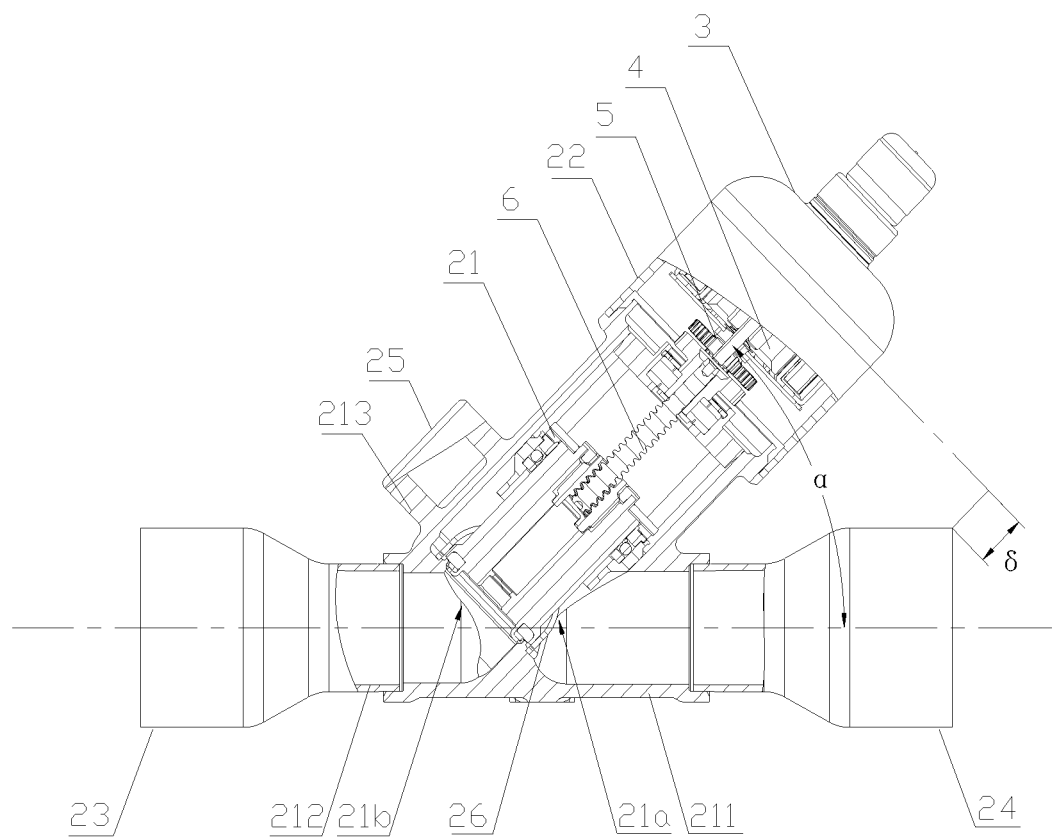
FIG. 4 is an axially sectional view of the electronic expansion valve in FIG. 3.
Figure 5:
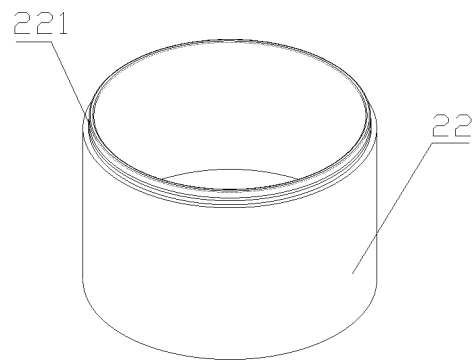
FIG. 5 is a schematic view showing the structure of a cover in FIG. 2.

Reference is made to FIGS. 2 to 4, FIG. 2 is a schematic view showing the structure of a valve seat assembly of an electronic expansion valve according to an embodiment of the present application; FIG. 3 is a schematic view showing the structure of an electronic expansion valve having the valve seat assembly in FIG. 2; and FIG. 4 is an axially sectional view of the electronic expansion valve in FIG. 3.

The electronic expansion valve in this embodiment includes a housing component 3 and a valve seat assembly. The valve seat assembly includes a first connecting pipe 24 and a second connecting pipe 23 substantially in a same straight line, the valve seat assembly is provided with a first port 211 and a second port 212 respectively connected to the first connecting pipe 24 and a second connecting pipe 23, and the first port 211 and the second port 212 here are also substantially in a same straight line. A main valve cavity is formed by the valve seat assembly, and a diameter of the main valve cavity in FIG. 2 is D0. An included angle formed between the main valve cavity and the first connecting pipe 24 is an acute angle, and correspondingly, an included angle formed between the main valve cavity and the second connecting pipe 23 is an obtuse angle, that is, the valve seat assembly is of a "ト"-like shape. A casing of the valve seat assembly is adapted to the structure of the main valve cavity, and generally, the casing of the valve seat assembly and the main valve cavity are both of a cylindrical shape. When the casing of the valve seat assembly corresponding to the main valve cavity is defined as a main valve seat, the included angle formed between the main valve seat and the first connecting pipe 24 is an acute angle.

As shown in FIG. 2, the valve seat assembly includes a valve seat 21 forming the main valve cavity, the first connecting pipe 24, the second connecting pipe 23, and a valve seat core 26 arranged inside the main valve cavity.

Moreover, the valve seat assembly is of an integral structure and is fixed to the housing component 3 by welding, and the housing component 3 may be machined to have an integral structure. After the valve seat assembly is formed, a motor 4, a valve rod assembly 6, a gear system 5, and other internal components of the electronic expansion valve are assembled in place, and are basically arranged in the valve seat assembly, and then the housing component 3 is covered outside the valve seat assembly, and the housing component 3 and the valve seat assembly are welded to form a complete sealed valve body. A welding position 2a of the valve seat assembly and the housing component 3 is required to meet the following condition: there is a preset distance between an extension line of the welding position 2a in a radial direction and the first connecting pipe 24.

The radial direction is a radial direction of the valve seat 21, that is a radial direction of the main valve cavity of the electronic expansion valve. The preset distance being provided between the extension line in the radial direction and the first connecting pipe 24 refers to that the extension line in the radial direction doesn't intersect with the first connecting pipe 24, and apparently, the present distance is a numerical value greater than zero.

A forming process of the electronic expansion valve is described as follows. Components, including the valve rod assembly 6, the gear system 5 and the motor 4, are mounted in the integral valve seat assembly; the housing component 3 is covered outside the valve seat assembly, and then the housing component 3 and the valve seat assembly are welded. Since the internal components in the valve body are mounted in place, a furnace brazing cannot be employed, and only an external welding can be adopted to weld the housing component 3 to the valve seat assembly, and it is preferable to use a laser welding or an argon arc welding having a better welding effect. Finally, the electronic expansion valve is formed.

For the electronic expansion valve manufactured according to the above process, when performing an external welding on the housing component 3 and the valve seat assembly, due to the preset distance between the extension line of the welding position 2a in the radial direction and the first connecting pipe 24, the welding can be smoothly performed without being blocked by the first connecting pipe 24 when the valve body rotates relatively to be welded, which allows the housing component 3 and the valve seat assembly to be welded to form an integral body. Compared with the threaded connection in the background technology, the electronic expansion valve in the present application is of an integral structure, which may obviously decrease the leakage rate of the product, and also, there is no need to increase the thickness and weight of the material, which may effectively control the manufacturing cost of the product.

The preset distance between the first connecting pipe 24 and the extension line of the welding position 2a of the valve seat assembly and the housing component 3 in the radial direction may be defined as δ. δ is the minimum distance between the extension line in the radial direction and an end of the first connecting pipe 24.

The distance can be obtained according to the following relational expression:

$$\delta = L1 - L2 \times \cos\alpha - (D3-D2)/2 \times \sin\alpha;$$

where α is an acute angle formed between the main valve cavity and the first connecting pipe 24, L1 is a distance between a base point of the valve seat 21 and an end portion (facing the housing component 3) of the valve seat assembly, L2 is a distance between the base point of the valve seat 21 and an end portion of the first connecting pipe 24, D3 is a diameter of the end portion of the first connecting pipe 24, and D2 is a diameter of the first port 211 of the valve seat assembly.

The base point of the valve seat 21 here refers to an intersection point of an extension line of an inner wall of the first port 211 of the valve seat assembly and an axis of the main valve cavity. Referring to FIG. 2, supposed that a complete cylindrical body is formed by the first port 211 and the second port 212, the base point of the valve seat 21 is the intersection point of the axis of the main valve cavity and an inner wall of the cylindrical body. It should be noted that, the first port 211 and the second port 212 are generally arranged to have the same structure, thus D2 may also be a diameter of the second port 212, thus the base point of the valve seat 21 may also be an intersection point of the axis of the main valve cavity and an extension line of an inner wall of the second port 212.

With such a design, the relational expression is established between specific parameters and the preset distance between the extension line of the welding position 2a in the radial direction and the first connecting pipe 24, and an appropriate preset distance may be obtained according to the relational expression. Or the appropriate preset distance may be obtained according to actual operation requirements of the electronic expansion valve. The size of each of the components of the valve seat assembly may be reasonably designed according to the preset distance and the above relational expression. L1 should be as short as possible under the premise of ensuring an operating stroke of the valve rod assembly 6, and the shorter the overhang of the valve seat assembly is, the higher the manufacturing accuracy of the valve port 21a is, and the material may be saved.

On this basis, α preferably ranges from 40 degrees to 60 degrees. For ensuring the welding of the valve seat assembly and the housing component 3 to performed smoothly, a certain value of δ should be guaranteed, and δ is preferably greater than or equal to 5 millimeters. If α is smaller than 40 degrees, for ensuring the value of δ, it is required to lengthen L1 or shorten L2, the lengthening of L1 is not good for the manufacturing accuracy and cost control, and if L2 is too short, heat may adversely affect the integrity of the connecting pipes and the valve seat assembly during welding pipelines and the connecting pipes. And also, flame during the welding may burn the motor 4 mounted in the valve seat assembly. If a is greater than 60 degrees, although this situation facilitates ensuring the value of δ, a circulation area of a communication port 21a through which the main valve cavity is in communication with the first connecting pipe 24 may be obviously smaller than an area of the valve port 21b (a communication port 21a through which the main valve cavity is in communication with the second connecting pipe 23), thus a throttling effect may be caused, which may adversely affect a refrigeration capacity, and in this case, to increase the area of the communication port 21a by changing the diameters of the main valve cavity and the first connecting pipe 24, the material and weight may be increased, and the cost may be raised.

For the above embodiments, in design, sizes of circulation ports may be set to meet the following relational expressions:

$$D3 > D2 \approx D1 > D; \text{ and } D4 \geq D2 \approx D1 > D;$$

where D1 is a diameter of the first port 211, D is a diameter of the valve port 21b, and D4 is a diameter of the communication port 21a. Thus, the first connecting pipe 24 and the second connecting pipe 23 each substantially has a flaring, and the area of the communication port 21a is slightly greater than the area of the valve port 21b. This design may facilitate flowing of fluid and reduce a flow resistance. Of course, other size designs may be adopted.

As shown in FIG. 2, the valve seat assembly has an irregular structure, thus there is a certain difficulty in directly manufacturing the valve seat assembly.

Figure 6:
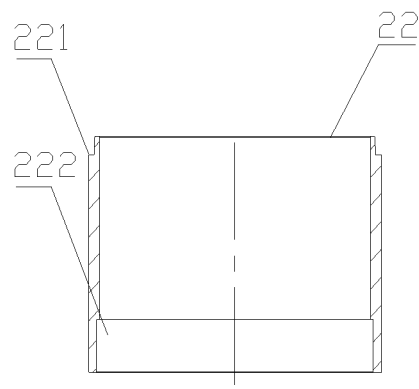
FIG. 6 is an axially sectional view of FIG. 5.
Figure 7:
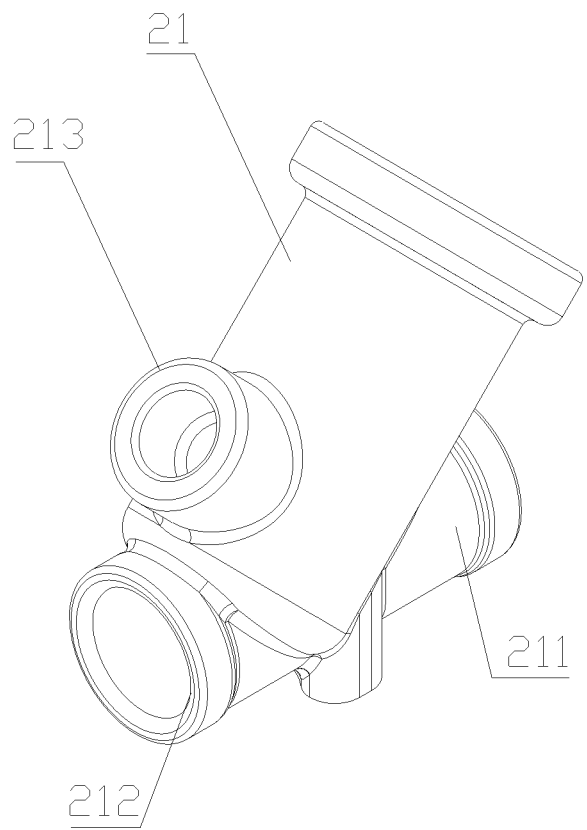
FIG. 7 is a schematic view showing the structure of a valve seat in FIG. 2.
Figure 8:
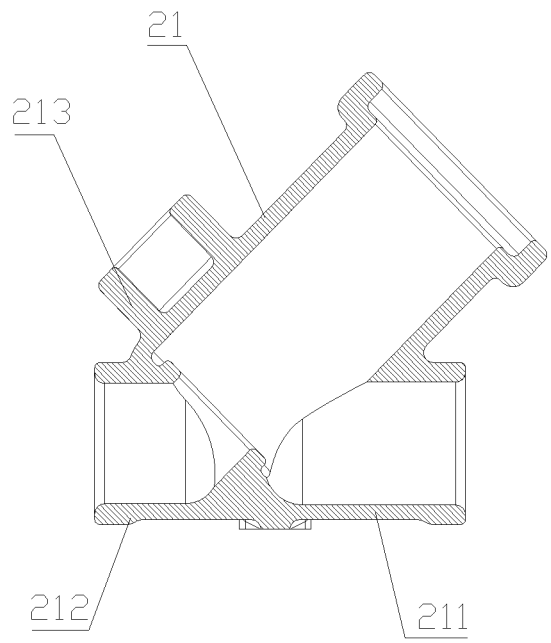
FIG. 8 is an axially sectional view of FIG. 7.

Reference is made to FIG. 2 and further to FIGS. 5 to 8, FIG. 5 is a schematic view showing the structure of a cover in FIG. 2; FIG. 6 is an axially sectional view of FIG. 5; FIG. 7 is a schematic view showing the structure of a valve seat in FIG. 2; and FIG. 8 is an axially sectional view of FIG. 7.

For facilitating forming an integral valve seat assembly, the valve seat assembly may include the valve seat 21, the cover 22, the first connecting pipe 24 and the second connecting pipe 23. The main valve cavity, the first port 211 and the second port 212 of the valve body are all formed in the valve seat 21, and the cover 22 has one end fixed to the housing component 3 by welding and another end fixed to the valve seat 21 by welding. As shown in FIG. 6, the cover 222 has an upper step 221 arranged at an outer periphery and a lower step 222 arranged at an inner periphery. In welding, the housing component 3 encloses the cover 22, a lower end surface of the housing component 3 presses against a stepped surface of the upper step 221, to form the welding position 2a; and an upper end surface of the valve seat 21 presses against a stepped surface of the lower step 222 of the cover 22, to form a welding position for the valve seat 21 and the cover 22. The cover 22 may be machined to have a straight tube shape, and may be formed by lathing bar stock or a tube-shaped semi-finished product, and such machining facilitates forming the cover 22 and saves material. The valve seat 21 and the cover 22 are separately arranged, which may reduce wobble of a cutter during the machining, and improve a machining accuracy for the size of the valve seat 21.

Figure 9:
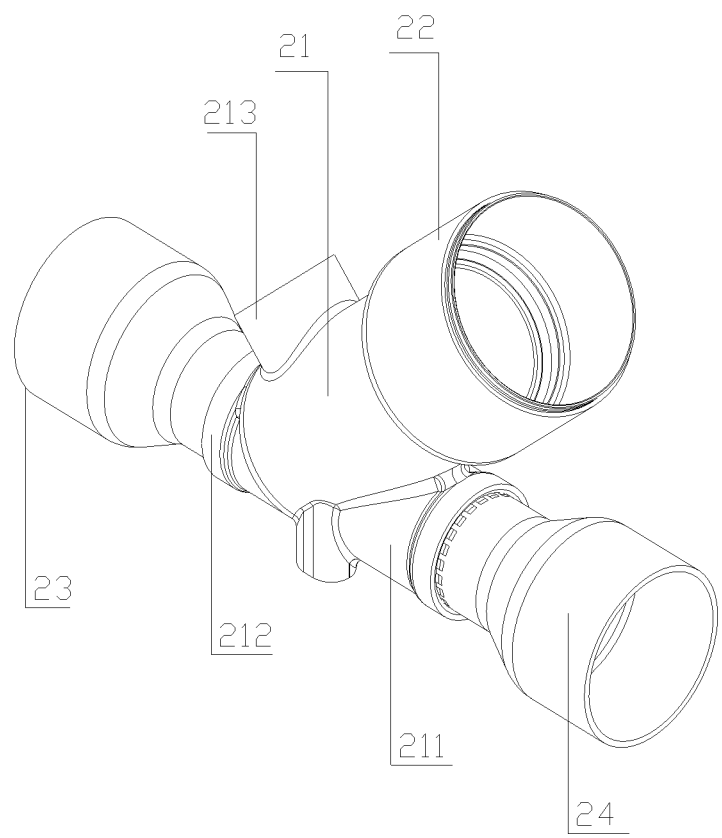
FIG. 9 is a schematic view showing the structure of the assembled valve seat assembly.

During the specific process of forming the valve seat assembly, firstly the first connecting pipe 24, the second connecting pipe 23 and the cover 22 are assembled to the valve seat 21 in place, and reference is made to FIG. 9, which is a schematic view showing the structure of the assembled valve seat assembly.

During assembly, a welding rod is placed in the welding position, and then the assembled valve seat assembly (still in a separated state) is placed in the furnace to be brazed, and an integrated valve seat assembly is formed after the braze welding is completed. The valve seat assembly formed in this manner has a good integrality, and can effectively prevent leakage.

Figure 10:
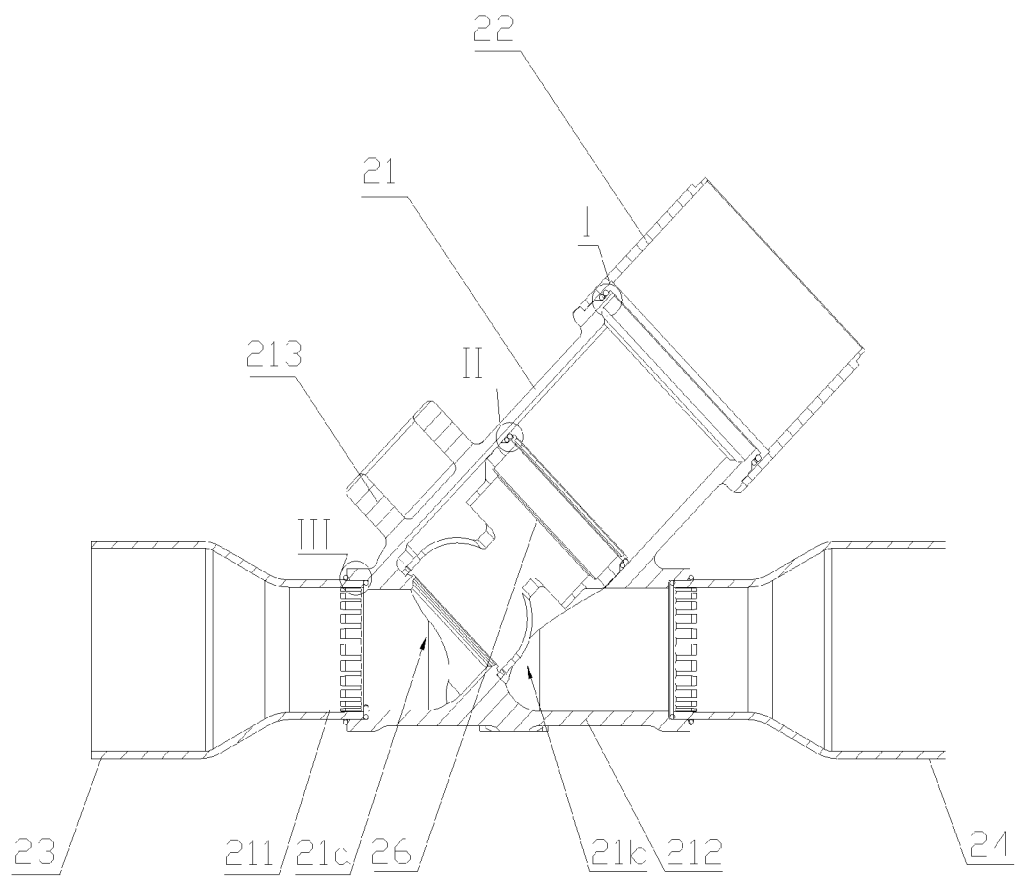
FIG. 10 is a schematic view showing the structure of the valve seat assembly in FIG. 2 before welding.
Figure 11:
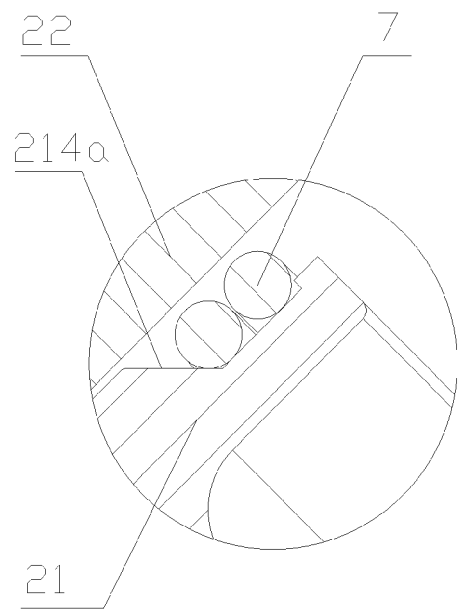
FIG. 11 is a partially enlarged schematic view of portion I in FIG. 10.
Figure 12:
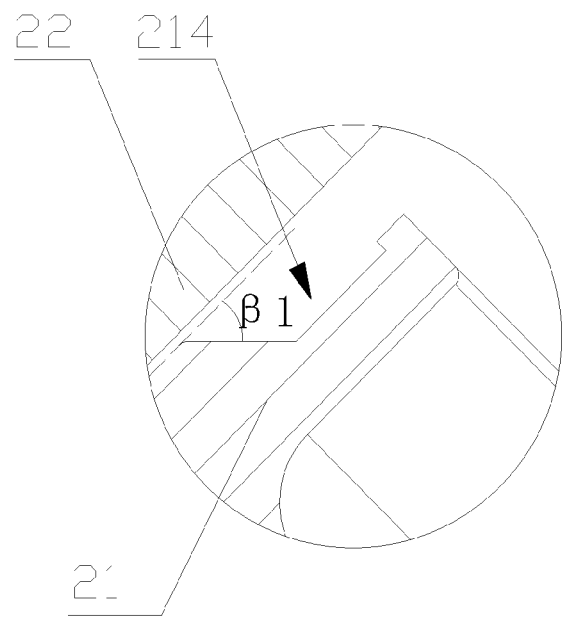
FIG. 12 is a schematic view showing the structure of FIG. 11 without a welding ring.

Reference is made to FIGS. 10 to 12, FIG. 10 is a schematic view showing the structure of the valve seat assembly in FIG. 2 before the welding; FIG. 11 is a partially enlarged schematic view showing portion I in FIG. 10; and FIG. 12 is a schematic view showing the structure in FIG. 11 without a welding ring.

Further, a first annular retaining groove 214 configured to position a welding ring 7 may be provided in an outer periphery of the valve seat 21. The welding ring 7 is required to be placed at the welding position 2a of the valve seat 21 and the cover 22 before the valve seat assembly being placed in the furnace. The first annular retaining groove 214 may position the welding ring 7, and prevent the welding ring 7 from moving before the welding which may adversely affect the welding effect. A lower end of the cover 22 is welded to the valve seat 21, and may be welded to an upper end portion of the valve seat 21 (an end portion facing the housing component 3), and as shown in FIG. 12, the first annular retaining groove 214 is machined at the upper end portion of the valve seat 21.

In this case, a groove wall at a lower side of the first annular retaining groove 214 may be arranged as a slope inclining downward, that is a first slope 214a shown in FIG. 12. The term "lower" here refers to a position lower than to the welding position. The groove wall of the lower side of the first annular retaining groove 214 is of the slope shape, which equals to that a downward inclining slope groove wall is provided at the lower side of the welding ring 7, thus during the welding, it may facilitate flowing of a welding flux to be filled in a clearance between the cover 22 and the valve seat 21 as shown in FIG. 12, to improve a welding reliability. An inclination angle β1 of the first slope 214a is preferably smaller than 60 degrees, thus the welding flux can flow more smoothly into the clearance. The inclination angle β1 is an included angle between the first slope 214a and an extension line of a lateral wall of the valve seat 21.

Figure 13:
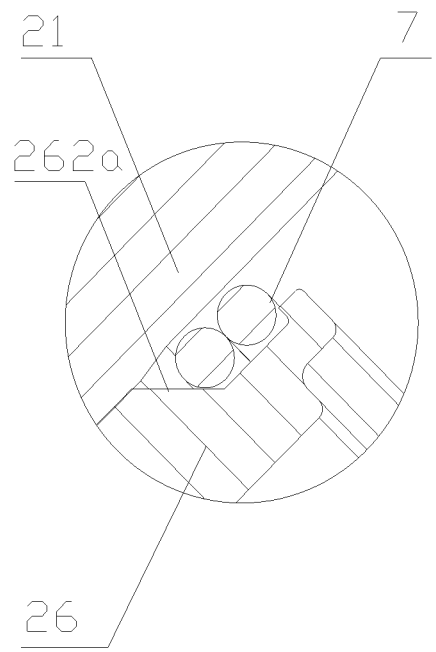
FIG. 13 is a partially enlarged schematic view of portion II in FIG. 10.
Figure 14:
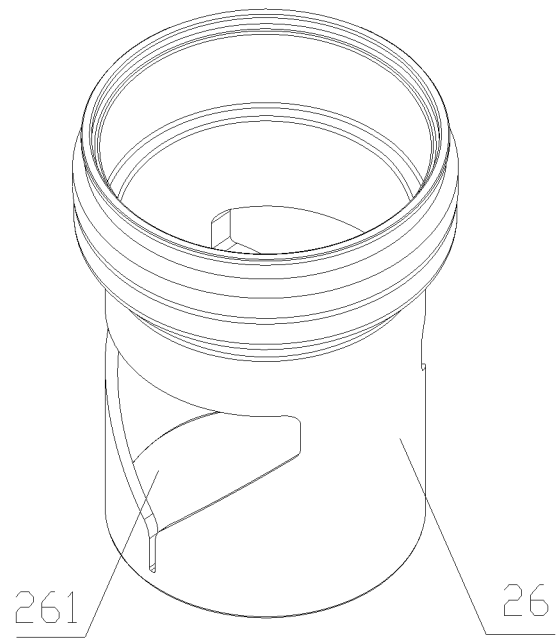
FIG. 14 is a schematic view showing the structure of a valve seat core in FIG. 10.
Figure 15:
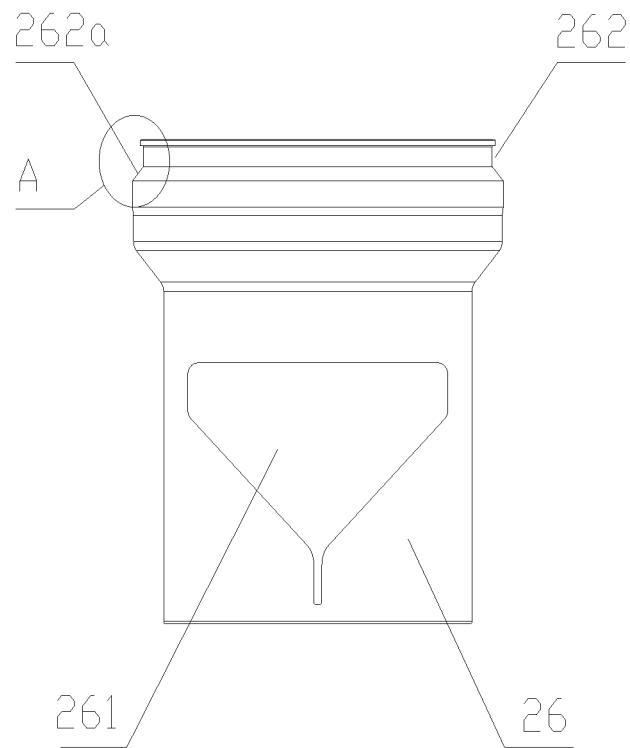
FIG. 15 is a front view of the valve seat core in FIG. 14.
Figure 16:
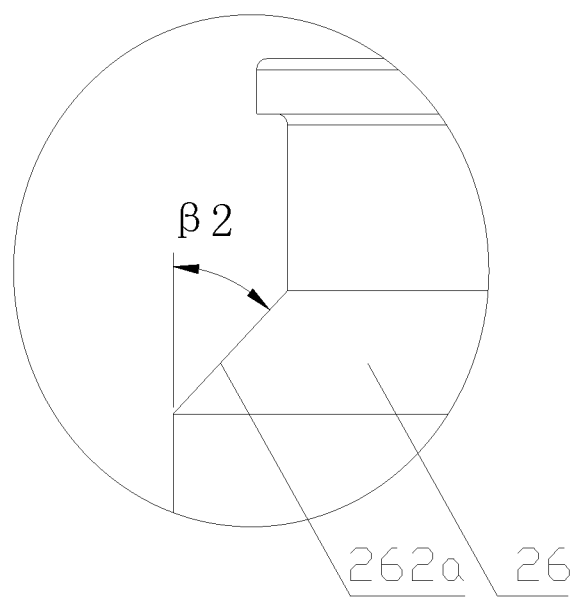
FIG. 16 is a partially enlarged schematic view of portion A in FIG. 15.

Reference is made to FIGS. 13 to 16, FIG. 13 is a partially enlarged schematic view showing portion II in FIG. 10; FIG. 14 is a schematic view showing the structure of a valve seat core in FIG. 10; FIG. 15 is a front view of the valve seat core in FIG. 14; and FIG. 16 is a partially enlarged schematic view showing the portion A in FIG. 15.

A valve seat core 26 may be provided in the main valve cavity of the valve seat assembly, and the valve seat core 26 cooperates with the valve rod assembly 6 to regulate the flow. As shown in FIGS. 14 to 15, a lateral hole 261 is provided in a lateral wall of the valve seat core 26, the lateral hole 261 is in communication with the first port 211, and a width of the lateral hole 261 is gradually increased in a direction away from the valve port 21b. When the valve rod moves axially to be disengaged from the valve port 21b, the first port 211 may be in communication with the valve port 21b via the lateral hole 261; and as the valve rod gradually moves upward, an area of the lateral hole 261 allowing the refrigerant to flow is gradually increased, thereby realizing an effect of regulating the refrigerant flow by the axial movement of the valve rod.

The valve seat core 26 may be fixed to the valve seat 21 by braze welding, to form an integrated valve seat assembly. When the above furnace brazing is performed, the valve seat core 26, the connecting pipes and the cover 22 are mounted to the valve seat 21 at the same time, and the welding ring 7 is placed at the welding position 2a, and then the valve seat core 26, the valve seat 21, the connecting pipes, and the cover 22 are placed into the furnace at the same time to be brazed, thereby forming the integral valve seat assembly.

Similar to the welding principle of the cover 22 and the valve seat 21, as shown in FIG. 13, a second annular retaining groove 262 for positioning a welding ring 7 may also be provided in an outer periphery of the valve seat core 26, to effectively position the welding ring 7 and ensure a welding effect. An upper end portion of the valve seat core 26 may be fixed to the valve seat 21 by welding, and correspondingly, the second annular retaining groove 262 is also provided in the upper end portion of the valve seat core 26, and by welding at the upper end portion, it is convenient for placing the welding ring 7, and also avoids affecting the forming and performance of the lateral hole 261. Similarly, a groove wall at a lower side of the second annular retaining groove 262 may also be arranged to have a slope shape inclining downward, such as a second slope 262a shown in FIG. 16. By arranging the second slope 262a, it may facilitate a welding flux to be filled in a clearance between the valve seat core 26 and the valve seat 21, and also an inclination angle β2 of the second slope 262a is preferably smaller than 60 degrees, and the inclination angle β2 is an included angle between the second slope 262a and an extension line of a lateral wall of the valve seat core 26.

Figure 17:
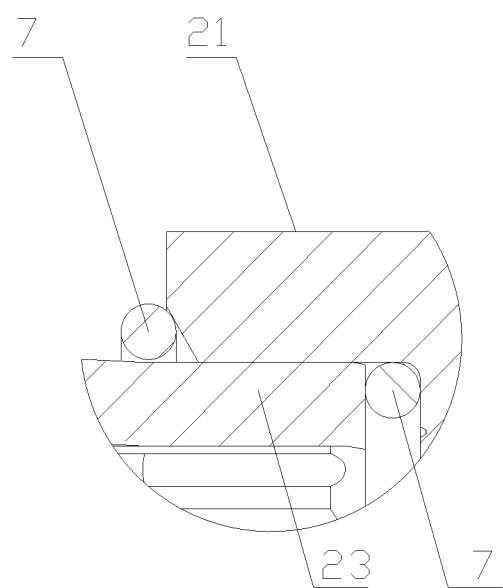
FIG. 17 is a partially enlarged schematic view of portion III in FIG. 10.

Reference is made to FIG. 17, which is a partially enlarged schematic view showing the portion III in FIG. 10.

Before the first connecting pipe 24 and the second connecting pipe 23 being welded to the valve seat 21, a welding ring 7 may be provided at both an inner side and an outer side of a position where the valve seat 21 is in contact with the connecting pipe. Taking the second connecting pipe 23 as an example, an inner wall of the second port 212 is provided with a step, the second connecting pipe 23 is inserted into the second port 212 to press against a stepped surface of the second port 212, a welding ring 7 is provided between an end surface of the second port 212 and an outer periphery of the second connecting port 23, and a welding ring 7 is also provided between an end surface of the second connecting pipe 23 and the stepped surface of the second connecting port 212. A welding manner of the first connecting pipe 24 is the same as that of the second connecting pipe 23, and positions where the welding rings 7 are arranged are the same. With such a design, the welding flux formed after the welding ring 7 is melted may be fully filled in clearances between the connecting pipes and the ports, thereby improving the welding reliability.

Figure 18:
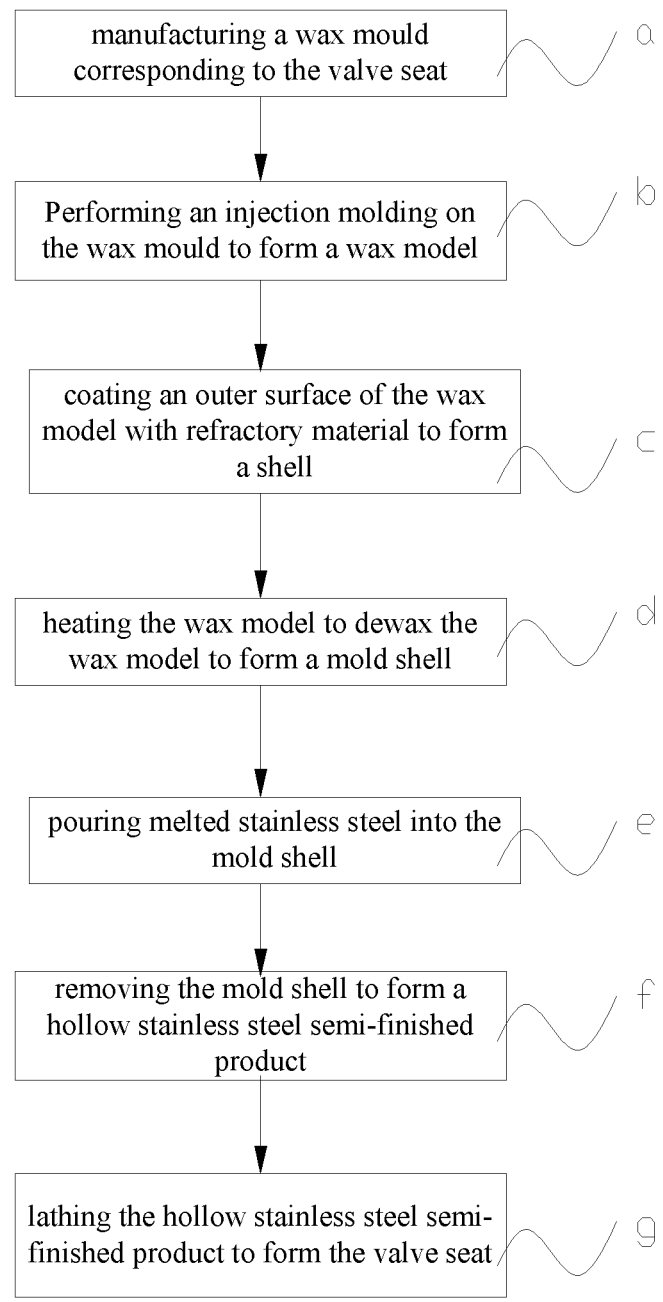
FIG. 18 is a flow diagram showing the manufacturing process of the valve seat in FIG. 2.

Reference is made to FIG. 18, which is a flow diagram showing the manufacturing process of the valve seat in FIG. 2.

For the above embodiments, the valve seat 21 of the valve seat assembly may be formed according to the processes of machining a hollow stainless steel semi-finished product, and then lathing the semi-finished product to form the valve seat 21.

A specific machining process of the hollow stainless steel semi-finished product includes the following steps.

Step a includes manufacturing a wax mold corresponding to the valve seat 21. The wax mold is a mold machined according to the valve seat 21 as required, and aluminum may be used for manufacturing the mold of this work piece.

Step b includes performing an injection molding on the wax mold. That is, wax is injected into the wax mold to form a wax model.

Step c includes manufacturing a shell with refractory material. The formed wax model (substantially conforming to the specification of the valve seat 21 required to be machined) is taken out, the refractory material is coated on the whole surface of the wax model to form the shell; and since the shell is required to be fire-proof in subsequent steps, the shell is made of the refractory material. The refractory material has various kinds, such as silica brick, clay brick, ad etc. It is preferably to use silica sol, multiple layers of the silica sol may be coated on the surface of the wax model to form the shell, and the silica sol has a good fire-resistant performance, and is suitable for stainless steel casting.

Step d includes heating the wax model for dewaxing the wax model. After being heated, the wax model is melted, and only the shell made from the refractory material is remained, to form a mold shell, and the mold shell obviously has a shape consistent with a shape of the valve seat 21 required to be manufactured.

Step e includes smelting the stainless steel and pouring the smelted stainless steel. That is, the melted liquid of the stainless steel is poured into the mold shell made from the refractory material.

Step f includes removing the mold shell to form a hollow stainless steel semi-finished product. After the stainless steel melted liquid in the mold shell is cooled, the stainless steel is shaped, and the stainless steel semi-finished product is formed after the mold shell is removed. Removal of the mold shell may be realized by a shot blasting treatment or an acid pickling treatment. A step of grinding a sprue may be performed between the step e and the step f to facilitate smooth proceeding of the step f.

Step g includes lathing the hollow stainless steel semi-finished product to form the valve seat 21.

The valve seat 21 is manufactured through the above process, and the valve seat 21 can be machined to have an irregular shape, such as a "⊢"-like shaped valve seat 21 in this embodiment, thus the above process facilitates complicated molding, and facilitates realizing the design idea. And the machined valve seat has a high rigidity, and a uniform designed wall thickness. Besides, the valve seat is formed by minimum quantity cutting, thus having a high size accuracy, and saving material.

It should be understood that, when it is required to machine the annular groove for fixing the welding ring 7 at the outer periphery of the valve seat 21, the annular groove may be formed in the above investment casting process.

In the above embodiments, the first connecting pipe 24 and the second connecting pipe 23 are generally made of brass. In fact, based on the investment casting process, the connecting pipes may also be made of the stainless steel material. In this case, in Step a, the manufactured wax mold includes a portion corresponding to the valve seat 21, and also includes portions corresponding to the first connecting pipe 24 and the second connecting pipe 23, and the whole wax mold corresponds to the assembled valve seat 21 and connecting pipes. After the hollow stainless steel semi-finished product is formed, the valve seat 21 and the connecting pipes which are integrated may be formed by minimum quantity cutting. Of course, the first connecting pipe 24 and the valve seat assembly also meet the requirement of the preset distance, to better realize welding of the housing component 3 and the cover 22. The connecting pipes made from the stainless steel material have the characteristic of a high strength, and is adapted to a high pressure situation, such as a CO2 system.

In addition, in the process of placing the valve seat core 26 in the valve seat 21, the valve seat core 26 may also be formed by the same investment casting process as the valve seat 21. The machining process of the valve seat core 26 includes:

a' manufacturing a wax mold corresponding to the valve seat core 26;

b' performing an injection molding on the wax mold;

c' manufacturing a shell with refractory material;

d' heating for dewaxing;

e' smelting stainless steel and pouring;

f' removing the shell to form a stainless steel semi-finished product; and g' lathing the hollow stainless steel semi-finished product to form the valve seat core 26.

Correspondingly, when it is required to arrange the annular groove in the valve seat core 26, the annular groove may also be formed by the investment casting process.

Figure 19:
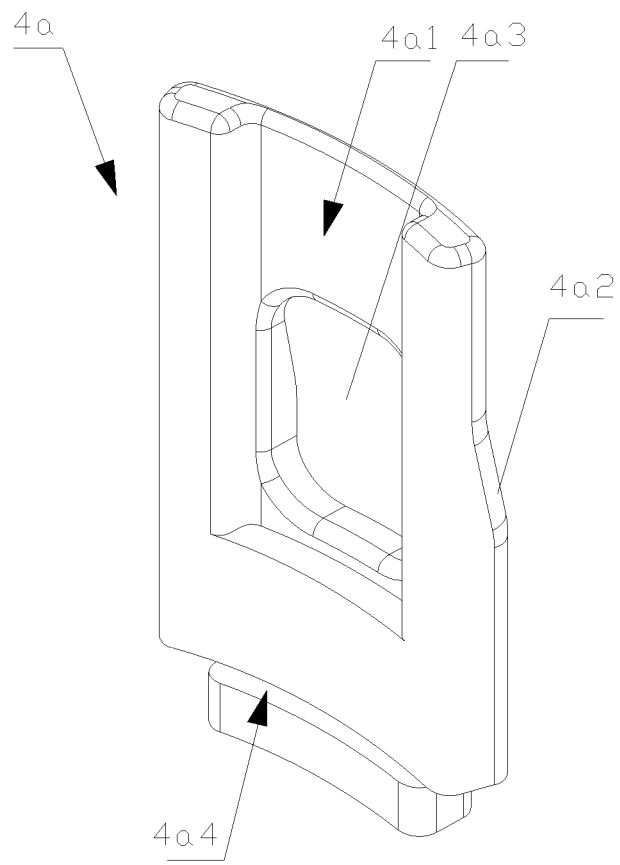
FIG. 19 is a schematic view showing the structure of a lead fixing device according to an embodiment of the present application.
Figure 20:
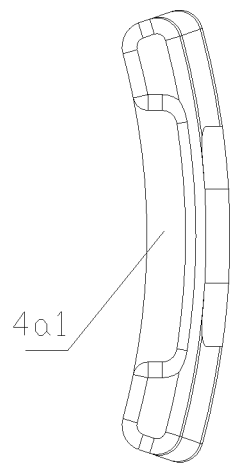
FIG. 20 is a top view of FIG. 19.
Figure 21:
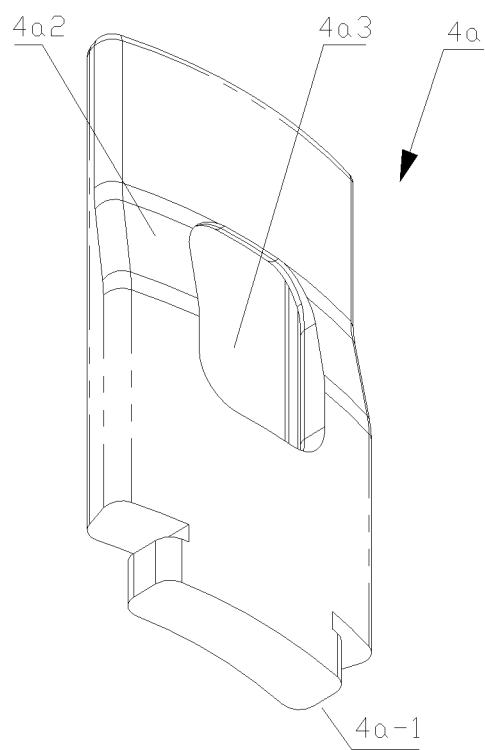
FIG. 21 is a schematic view showing the lead fixing device in FIG. 19 in another angle.
Figure 22:
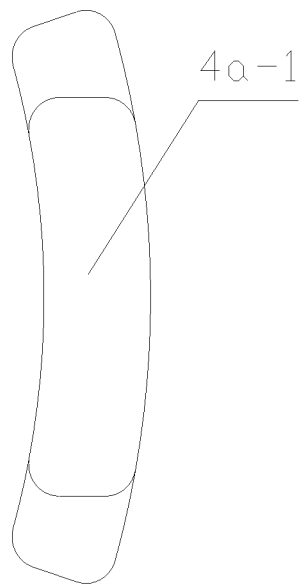
FIG. 22 is a bottom view of FIG. 21.
Figure 23:
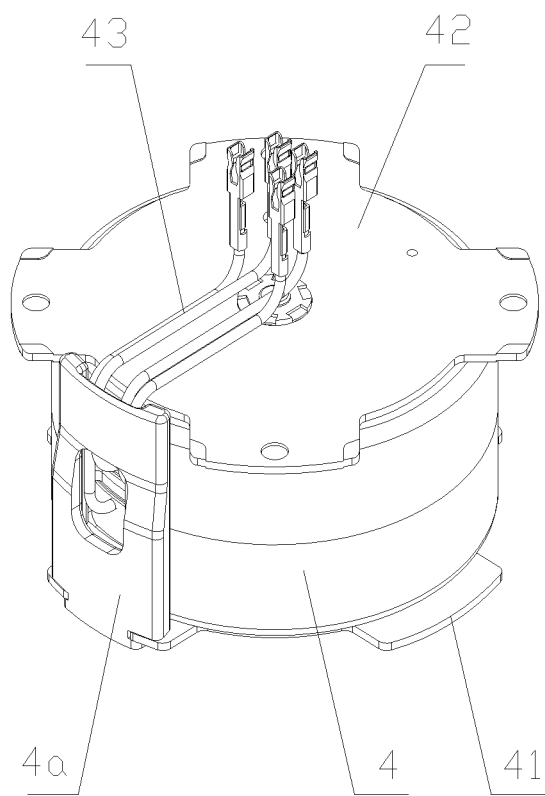
FIG. 23 is a schematic view showing the structure of a motor with the lead fixing device in FIG. 19 mounted thereon.
Figure 24:
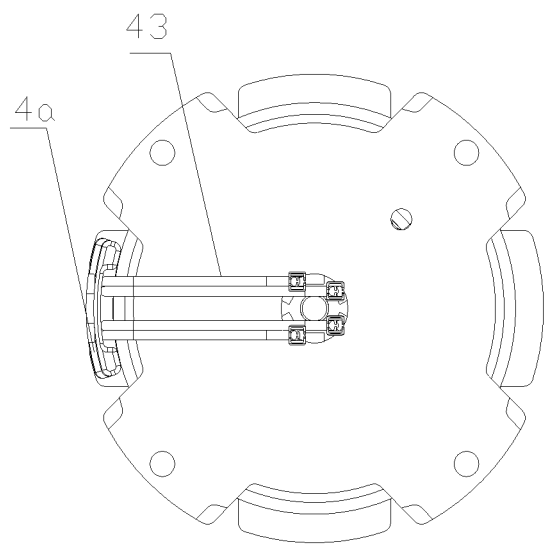
FIG. 24 is a top view of FIG. 23.
Figure 25:
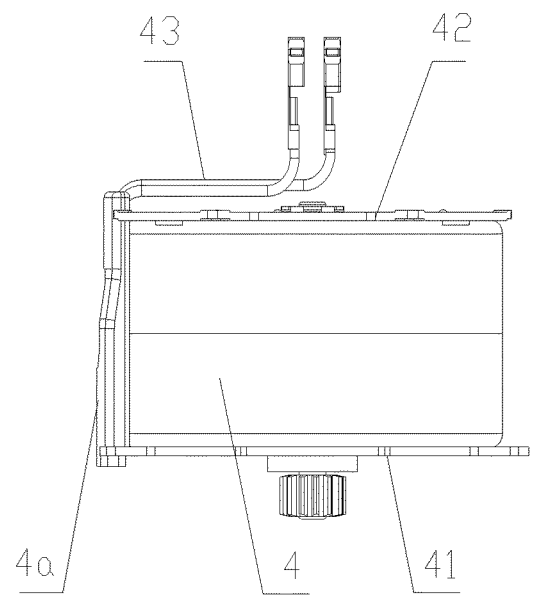
FIG. 25 is a front view of FIG. 23.

Reference is made to FIGS. 19 to 25, FIG. 19 is a schematic view showing the structure of a lead fixing device according to an embodiment of the present application; FIG. 20 is a top view of FIG. 19; FIG. 21 is a schematic view showing the lead fixing device in FIG. 19 from another angle; FIG. 22 is a bottom view of FIG. 21; FIG. 23 is a schematic view showing the structure of a motor with the lead fixing device in FIG. 19 mounted thereon; FIG. 24 is a top view of FIG. 23; and FIG. 25 is a front view of FIG. 23.

The lead fixing device 4*a* is mounted at an outer periphery of the motor 4 of the electronic expansion valve, as shown in FIGS. 23 and 25, leads 43 of the motor 4 extend to an edge of a top of the motor 4 along the top of the motor 4, and then bend to continue to extend to the outer periphery of the motor 4, and are generally led into a housing of the motor 4 at an approximately middle portion of the outer periphery of the motor 4. The top and the bottom 4*a*-1 in this specification are both defined on basis of FIG. 23. When the motor 4 is mounted to the electronic expansion valve, the bottom 4*a*-1 is close to the valve seat assembly, and the top is away from the valve seat assembly.

The lead fixing device 4*a* has a lead groove 4*a*1 configured to accommodate the leads 43 of the motor 4, and is mounted on the outer periphery of the motor 4, thus the parts of the leads 43 extending to the outer periphery of the motor 4 can be stuck in the lead groove 4*a*1. For preventing the lead fixing device 4*a* from being disengaged from the motor 4, the lead fixing device 4*a* is further provided with a positioning portion configured to fix the position of the lead fixing device 4*a* with respect to the housing of the motor 4.

Figure 26:
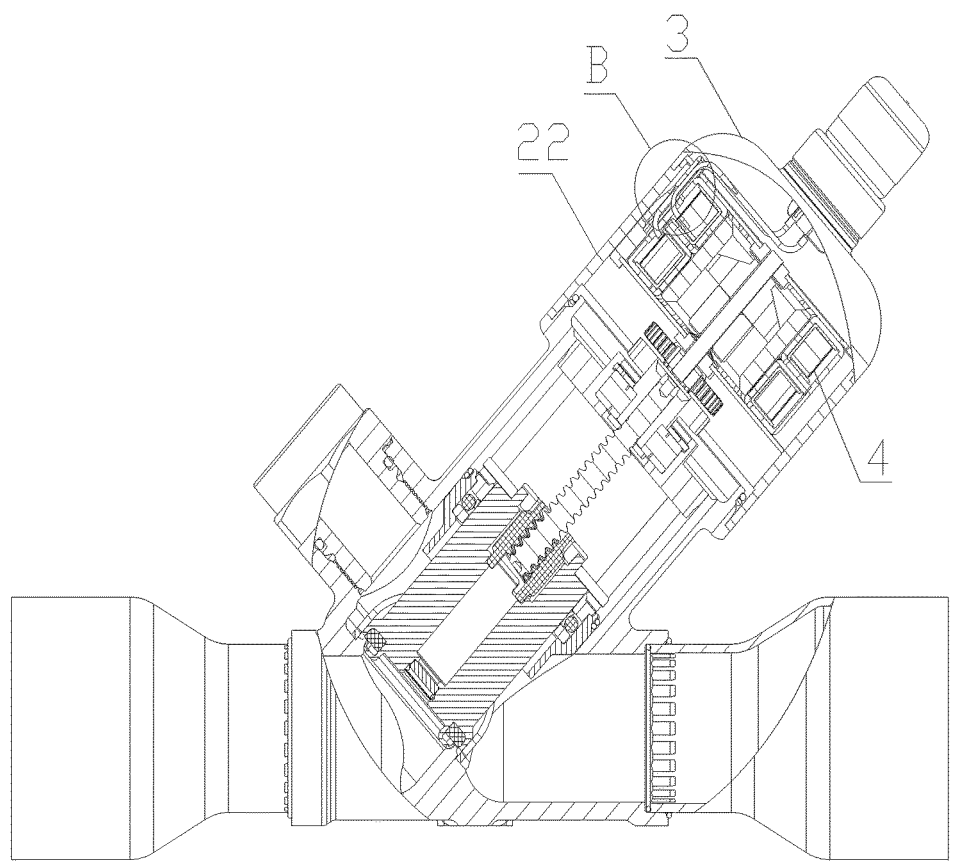
FIG. 26 is an axially sectional view of an electronic expansion valve having the motor in FIG. 23.
Figure 27:
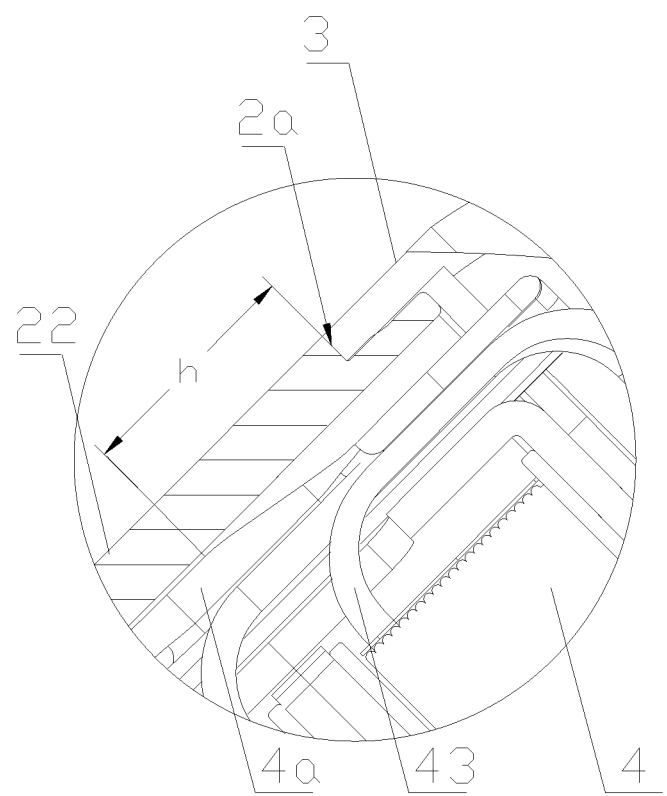
FIG. 27 is a partially enlarged schematic view of portion B in FIG. 26.

Reference is made to FIGS. 26 and 27, FIG. 26 is an axially sectional view of an electronic expansion valve including the motor in FIG. 23; and FIG. 27 is a partially enlarged schematic view showing portion B in FIG. 26.

The motor 4 of the electronic expansion valve is mainly mounted in an inner cavity of the cover 22 of the valve seat assembly, the cover 22 has an end portion fixed to the housing component 3 by welding, and the leads 43 at the outer periphery of the motor 4 are close to the welding position 2*a*. For the electronic expansion valve that is completely assembled, the lead fixing device 4*a* is located between the outer periphery of the motor 4 and the cover 22 (and the housing component 3), and the leads 43 are confined in the lead groove 4*a*1 of the lead fixing device 4*a*. A clearance between the outer periphery of the motor 4 and the cover 22 is small, and the lead fixing device 4*a* is only required to accommodate the leads 43, thus the lead fixing device 4*a* may be machined to have a plate-like structure, as shown in FIG. 19.

In this way, the leads 43 are positioned in the lead fixing device 4*a*, and this structural design is made in consideration of the following situation. To obtain a reasonable preset distance between the first connecting pipe 24 and the extension line of the welding position 2*a* of the valve seat assembly and the housing component 3 in the radial direction, the welding position 2*a* is moved upward, and thus is close to the motor 4, which may cause a problem that the position of the leads 43 is close to the welding position 2*a*. In this situation, the confine function of the lead fixing device 4*a* allows the leads 43 to keep a certain distance from the welding position 2*a*, thereby preventing the leads 43 from being burned by the welding heat.

Figure 28:
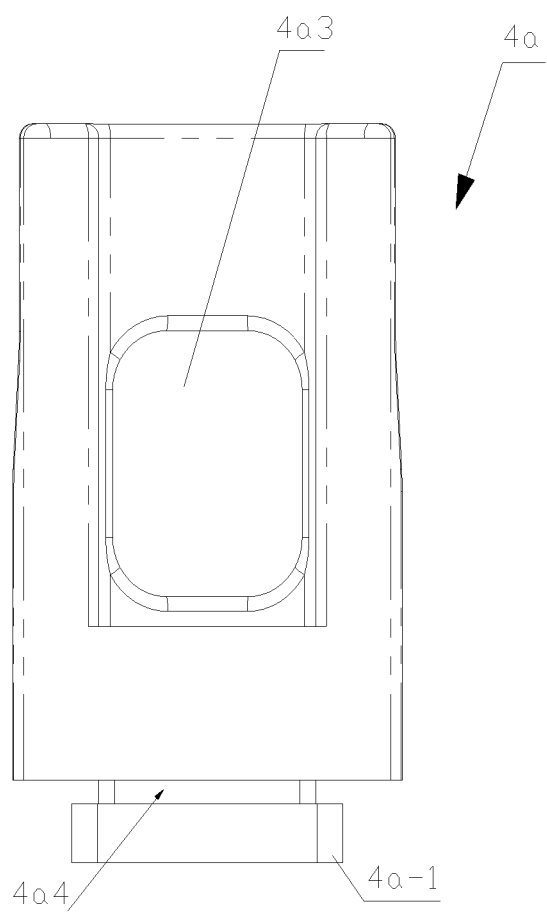
FIG. 28 is a front view of FIG. 19.

Reference is still made to FIGS. 19 and 20 and further to FIG. 28, FIG. 28 is a front view of FIG. 19, and shows an inner surface of the lead fixing device 4*a*.

The inner surface here is a surface, facing the outer periphery of the motor 4, of the lead fixing device 4*a* after the lead fixing device 4*a* is mounted to the motor 4, and an outer surface is a surface, away from the outer periphery of the motor 4, of the lead fixing device 4*a* (that is a surface facing the cover 22). As shown in the Figures, the lead fixing device 4*a* has a through hole 4*a*3 running through the inner surface and the outer surface of the lead fixing device 4*a*, and the through hole 4*a*3 is in communication with the lead groove 4*a*1, which equals to provide a through hole in a groove wall of the lead groove 4*a*1.

The leads 43 may be provided in the lead groove 4*a*1, and the through hole 4*a*3 may provide a certain accommodation space. In the case that the leads 43 have a too small bending radius and are extruded in the lead groove 4*a*1, a part of the leads 43 may be accommodated in the through hole 4*a*3, to avoid stress concentration caused by extrusion, and further avoid damage to the leads 43 caused by the stress concentration.

Figure 29:
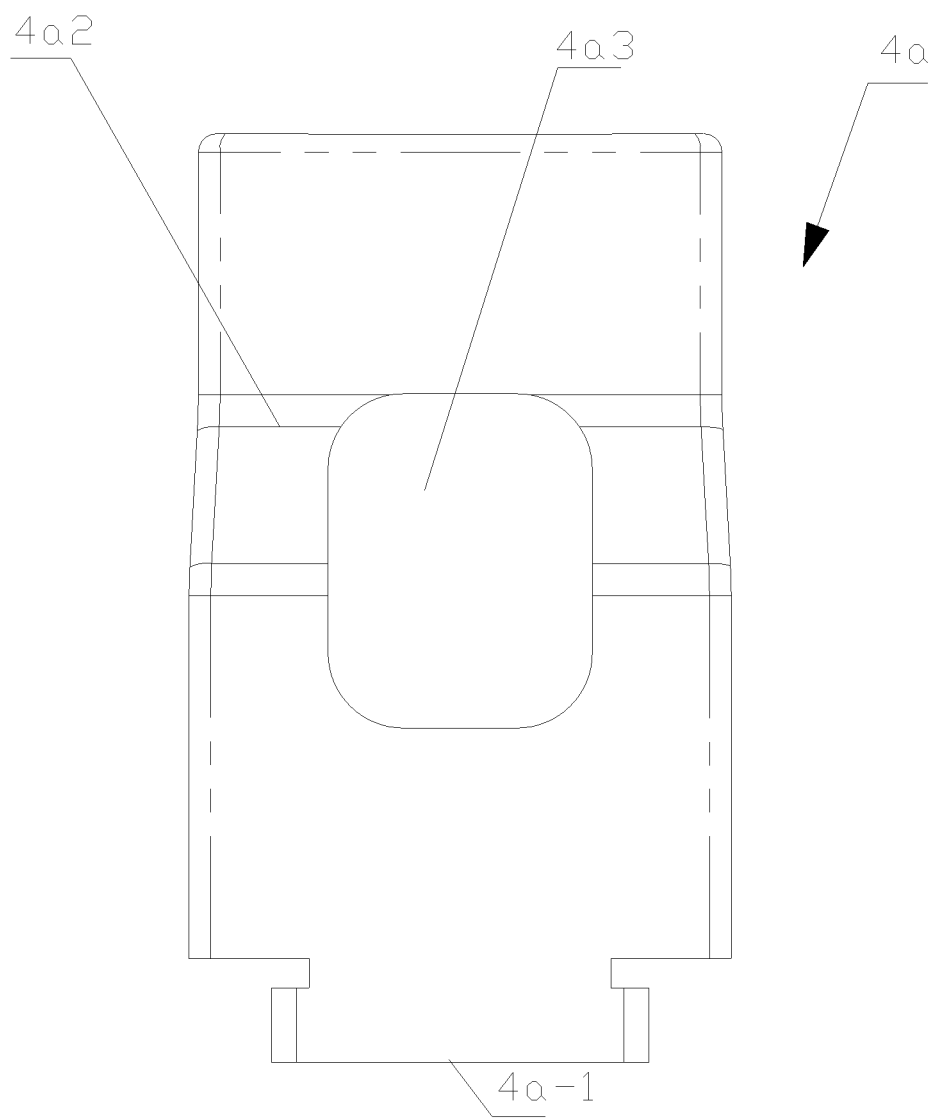
FIG. 29 is a front view of FIG. 21.
Figure 30:
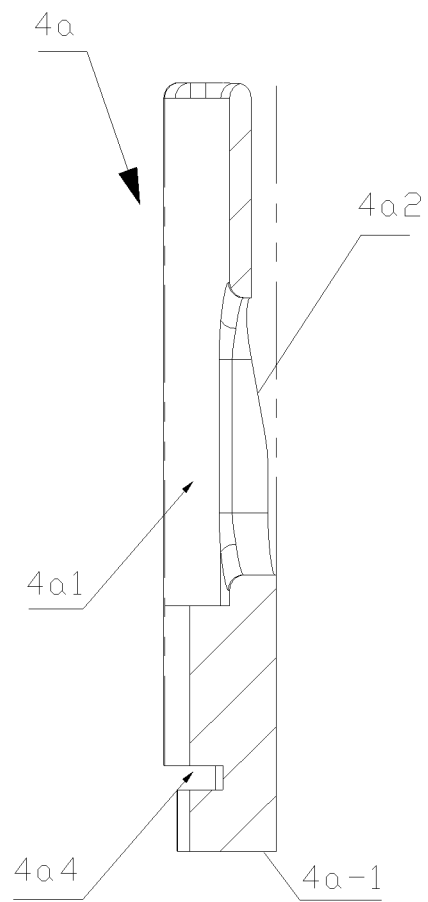
FIG. 30 is a sectional view of FIG. 29.
Figure 31:
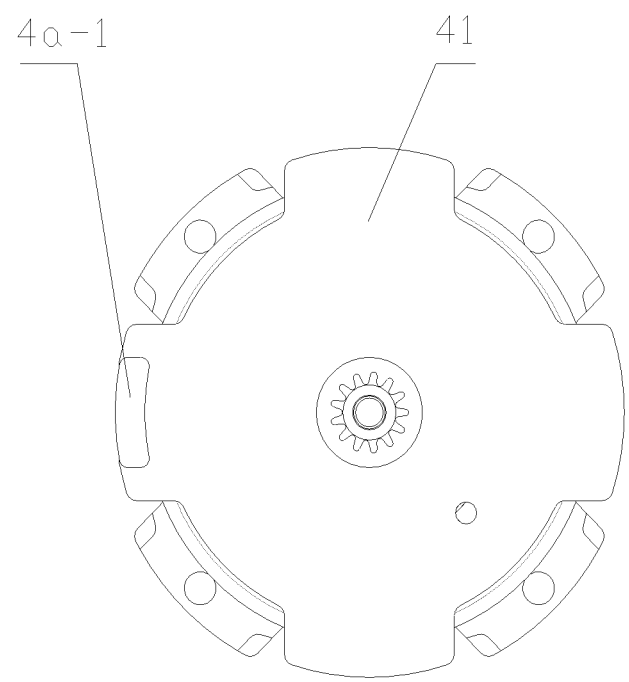
FIG. 31 is a bottom view of FIG. 23.

Reference is still made to FIGS. 19, 23 and 28, and further to FIGS. 29 to 31, FIG. 29 is a front view of FIG. 21 and shows the outer surface of the lead fixing device 4*a*; FIG. 30 is a sectional view of FIG. 29; and FIG. 31 is a bottom view of FIG. 23.

As described hereinabove, the lead fixing device 4*a* needs to be provided with the positioning portion to be positioned on the motor 4, to prevent disengagement and movement of the lead fixing device 4*a* from causing a case of failing to position the leads 43. In this embodiment, the positioning portion is embodied as a retaining groove 4*a*4 at the bottom 4*a*-1 of the lead fixing device 4*a*, and the retaining groove 4*a*4 can be retain an outer edge of a bottom end cover 41 of the motor 4, as shown in FIG. 23. The lead fixing device 4*a* here is of a buckle-like shape.

During the process of mounting the lead fixing device 4*a*, the lead fixing device 4*a* is mounted to the outer periphery of the motor 4 at the position corresponding to the leads 43, to confine the leads 43 in the lead groove 4*a*1, and meanwhile the retaining groove 4*a*4 at the bottom 4*a*-1 of the lead fixing device 4*a* can just retain the bottom end cover 41 of the motor 4, thus the lead fixing device 4*a* cannot move up and down. Due to the interference between the lead groove 4*a*1 and the leads 43, the lead fixing device 4*a* can not move left and right. Moreover, the lead fixing device 4*a* is located between the outer periphery of the motor 4 and the cover 22, if a thickness of the lead fixing device 4*a* is appropriately set, the lead fixing device 4*a* may be limited between the outer periphery of the motor 4 and the cover 22, thus the lead fixing device 4*a* is difficult to move front and rear in the radial direction, and a basic positioning of the lead fixing device 4*a* is realized.

The retaining groove 4*a*4 is arranged at the bottom 4*a*-1 of the lead fixing device 4*a*, to retain the bottom end cover 41 of the motor 4, and the leading of the leads 43 at the top of the motor 4 may not be interfered. It should be appreciated that, the positioning manner between the lead fixing device 4*a* and the bottom end cover 41 may also be applied to a top end cover 42. For example, it is also feasible to provide a retaining groove 4*a*4 at the top of the lead fixing device 4*a* to retain the top end cover 42, however when providing the positioning portion at the top, it is required to avoid the leads 43. Referring to FIGS. 24 and 20, the lead groove 4*a*1 has no top groove wall, to avoid interference with the leads 43, that is, the lead groove 4*a*1 has a groove opening facing the leads 43, and a top of the groove opening is opened. It may be concluded that, in the case that the positioning portion is arranged at the top of the lead fixing device 4*a*, the corresponding difficulties in design and machining may be higher than that of the technical solution of arranging the positioning portion at the bottom 4*a*-1.

In addition to the above retaining groove 4*a*4, the positioning portion may be of other structures. For example, a retaining clip may be directly provided at the bottom 4*a*-1 of the lead fixing device 4*a* to clamp the bottom end cover 41. For another example, the bottom 4*a*-1 of the lead fixing device 4a may be directly adhered to the outer periphery of the motor 4. Or, the bottom 4a-1 of the lead fixing device 4a may be connected to the bottom end cover 41 via threads, of course, in this manner, the motor 4 is required to be modified. Other conventional positioning manners may be employed by those skilled in the art to position the lead fixing device 4a to the outer periphery of the motor 4.

Reference is made to FIGS. 27, 29 and 30, the outer surface of the lead fixing device 4a away from the motor 4 may be provided with a step 4a2, and the step 4a2 is arranged with a stepped surface facing upward, and the step 4a2 is arranged at an upper portion of the lead fixing device 4a. After the step 4a2 is arranged, a portion of the lead fixing device 4a below the step 4a2 has a large thickness, and may fit with the cover 22 to be limited between the motor 4 and the cover 22, while a certain clearance exists between a portion of the lead fixing device 4a above the step 4a2 and the cover 22, thus a certain clearance may exist between the leads 43 in the lead groove 4a1 and the housing component 3 made from metal material as well as between the leads 43 in the lead groove 4a1 and the cover 22, thereby increasing a distance of transferring heat at the welding line to the lead groove 4a1, and further preventing the leads 43 from being damaged by the welding heat. Besides, there is a clearance h between the welding position 2a and the portion, fitting with the cover 22, of the lead fixing device 4a below the step 4a2, thereby also ensuring that the lead fixing device 4a that fits with the cover 22 may not be affected by the welding position 2a. The leads 43 are generally located at an upper portion of the outer periphery of the motor 4, and correspondingly, the step 4a2 is also located at the upper portion of the lead fixing device 4a. In FIG. 13, the surface of the step 4a2 is arranged to have a slope shape, which on one hand may facilitate machining, and on the other hand may not adversely affect the accommodation function of the through hole on the premise of ensuring the arrangement of the clearance.

For the above embodiments, each of the inner surface and the outer surface of the lead fixing device 4a is preferably arranged to have an arc shape, and has a radian matching with a radian of the outer peripheral surface of the motor 4. Each of the housing component 3 and the cover 22 is generally arranged to have a cylindrical shape, a clearance between the housing component 3 and the outer periphery of the motor 4 and a clearance between the cover 22 and the outer periphery of the motor 4 are both an annular clearance. Thus, the arc-shaped lead fixing device 4a can be well adapted to the annular clearances, thereby facilitating installment and positioning, and also ensuring that the leads 43 can be smoothly accommodated in the lead groove 4a1.

As described hereinabove, a vital function of the lead fixing device 4a is to prevent the welding heat from burning the leads 43, therefore the lead fixing device 4a is preferably made from thermal insulation material, to enhance an thermal insulation effect and better protect the leads 43. The lead fixing device 4a here may be made from plastic or ceramic, and these two kinds of thermal insulation materials have a good thermal insulation performance and a low cost.

The electronic expansion valve and the manufacture method thereof provided by the present application are described in detail hereinbefore. The principle and the embodiments of the present application are illustrated herein by specific examples. The above description of examples is only intended to help the understanding of the method and the spirit of the present application. It should be noted that, for the person skilled in the art, a few of modifications and improvements may be made to the present application without departing from the principle of the present application, and these modifications and improvements are also deemed to fall into the scope of the present application defined by the claims.

What is claimed is:

1. An electronic expansion valve, comprising a housing component and a valve seat assembly, the valve seat assembly comprising a first connecting pipe and a second connecting pipe which are in a same straight line; a main valve cavity being formed by the valve seat assembly, and an included angle formed between the main valve cavity and the first connecting pipe being an acute angle; wherein the valve seat assembly is of an integral structure and is fixed to the housing component by welding, and a preset distance exists between the first connecting pipe and an extension line of a welding position of the valve seat assembly and the housing component in a radial direction; and wherein a minimum distance δ between the extension line in the radial direction and an end portion of the first connecting pipe meets the relational expression:

$$\delta = L1 - L2 \times \cos\alpha - (D3 - D2)/2 \times \sin\alpha;$$

where α is the included angle, which is the acute angle, L1 is a distance between a base point of the valve seat assembly and an end portion of the valve seat assembly, L2 is a distance between the base point of the valve seat assembly and the end portion of the first connecting pipe, D3 is a diameter of the end portion of the first connecting pipe, and D2 is a diameter of a port, configured to connect the first connecting pipe, of the valve seat assembly; and the base point of the valve seat assembly is an intersection point of an axis of the main valve cavity and an extension line of an inner wall of the port.

2. The electronic expansion valve according to claim 1, wherein the minimum distance δ between the extension line in the radial direction and the end portion of the first connecting pipe is greater than or equal to 5 millimeters.

3. The electronic expansion valve according to claim 1, wherein the included angle α, which is the acute angle, ranges from 40 degrees to 60 degrees.

4. The electronic expansion valve according to claim 1, wherein the valve seat assembly and the housing component are fixed by laser welding or argon arc welding.

5. The electronic expansion valve according to claim 1, further comprising a motor that is provided with a lead fixing device configured to fix a position of a lead of the motor; and the lead fixing device has a lead groove configured to accommodate the lead of the motor, and a positioning portion configured to fix the position of the lead fixing device with respect to an outer periphery of the motor.

6. The electronic expansion valve according to claim 5, wherein the lead fixing device has a through hole running through an inner surface and an outer surface of the lead fixing device, and the through hole is in communication with the lead groove.

7. The electronic expansion valve according to claim 5, wherein the positioning portion is a retaining groove at a bottom of the lead fixing device, and the retaining groove is configured to retain an outer edge of a bottom end cover of the motor.

8. The electronic expansion valve according to claim 5, wherein a step is formed on an outer surface, away from the motor, of the lead fixing device, and the step has a surface facing upward; and the step is located at an upper portion of the lead fixing device.

9. The electronic expansion valve according to claim 5, wherein the lead fixing device has an inner surface and an outer surface, wherein each of the inner surface and the outer surface of the lead fixing device is arranged to have an arc shape, and has a radian matching with a radian of an outer peripheral surface of the motor; and the lead fixing device is made from thermal insulation material.

10. The electronic expansion valve according to claim 1, wherein the valve seat assembly comprises a valve seat and a cover, the main valve cavity is formed in the valve seat; the cover has one end fixed to the housing component by welding and another end welded to the valve seat by braze welding to form an integrated body; and the first connecting pipe and the second connecting pipe are both welded to the valve seat by braze welding to form an integrated body.

11. The electronic expansion valve according to claim 10, wherein the valve seat assembly further comprises a valve seat core arranged in the main valve cavity, and the valve seat core is fixed to the valve seat by braze welding to form an integrated body.

12. The electronic expansion valve according to claim 11, wherein an outer periphery of the valve seat core and/or an outer periphery of the valve seat each is provided with an annular groove configured to position a welding ring; and a groove wall at a lower side of the annular groove is a slope inclining downward.

13. The electronic expansion valve according to claim 12, wherein an angle of the slope is smaller than 60 degrees.

14. A manufacture method of an electronic expansion valve, the electronic expansion valve comprising a housing component and a valve seat assembly, the valve seat assembly comprising a first connecting pipe and a second connecting pipe which are in a same straight line; a main valve cavity being formed by the valve seat assembly, and an included angle formed between the main valve cavity and the first connecting pipe being an acute angle; wherein:
the manufacture method comprises the following steps:
manufacturing an integrated valve seat assembly, and setting a preset distance between the first connecting pipe and an extension line of a welding position of the valve seat assembly and the housing component in a radial direction; and
fixing the housing component and the valve seat assembly at the welding position by welding;
wherein a minimum distance δ between the extension line in the radial direction and an end portion of the first connecting pipe meets the relational expression:

δ=$L1-L2\times\cos\alpha-(D3-D2)/2\times\sin\alpha$;

where α is the included angle, which is the acute angle, L1 is a distance between a base point of the valve seat assembly and an end portion of the valve seat assembly, L2 is a distance between the base point of the valve seat assembly and the end portion of the first connecting pipe, D3 is a diameter of the end portion of the first connecting pipe, and D2 is a diameter of a port, configured to connect the first connecting pipe, of the valve seat assembly; and the base point of the valve seat assembly is an intersection point of an axis of the main valve cavity and an extension line of an inner wall of the port.

15. The manufacture method according to claim 14, comprising the following steps for manufacturing the integrated valve seat assembly:

preparing components of the valve seat assembly, comprising a valve seat configured to form the main valve cavity, the first connecting pipe and the second connecting pipe configured to be connected to the valve seat, and a cover configured to be welded to the housing component;
mounting the first connecting pipe and the second connecting pipe to ports of the valve seat respectively, and mounting the cover to an end portion of the valve seat; and
placing the first connecting pipe, the second connecting pipe, the valve seat, and the cover which are mounted in place in a furnace at the same time, and performing braze welding.

16. The manufacture method according to claim 15, wherein the valve seat is formed by the following steps:
manufacturing a wax mould corresponding to the valve seat;
perform an injection molding on the wax mould to form a wax model;
coating an outer surface of the wax model with refractory material to form a shell;
heating the wax model to dewax the wax model to form a mold shell;
pouring melted stainless steel into the mold shell;
removing the mold shell to form a hollow stainless steel semi-finished product; and
lathing the hollow stainless steel semi-finished product to form the valve seat.

17. The manufacture method according to claim 15, wherein the valve seat, the first connecting pipe and the second connecting pipe are formed by the following steps:
manufacturing a wax mould corresponding to an assembly of the valve seat, the first connecting pipe and the second connecting pipe being assembled together;
perform an injection molding on the wax mould to form a wax model;
coating an outer surface of the wax model with refractory material to form a shell;
heating the wax model to dewax the wax model to form a mold shell;
pouring melted stainless steel into the mold shell;
removing the mold shell to form a hollow stainless steel semi-finished product; and
lathing the hollow stainless steel semi-finished product to form an integrated body of the valve seat, the first connecting pipe and the second connecting pipe.

18. The manufacture method according to claim 15, wherein the components of the valve seat assembly further comprise a valve seat core, and the steps for manufacturing the integrated valve seat assembly comprises mounting the valve seat core in the valve seat, and placing the valve seat core together with the first connecting pipe, the second connecting pipe, the valve seat, and the cover in the furnace at the same time, and performing braze welding.

19. The manufacture method according to claim 18, wherein the valve seat core is formed by the following steps:
manufacturing a wax mould corresponding to the valve seat core;
perform an injection molding on the wax mould to form a wax model;
coating an outer surface of the wax model with refractory material to form a shell;
heating the wax model to dewax the wax model to form a mold shell;
pouring melted stainless steel into the mold shell;

removing the mold shell to form a hollow stainless steel semi-finished product; and lathing the hollow stainless steel semi-finished product to form the valve seat core.

\* \* \* \* \*